United States Patent [19]

Stodt

[11] 4,200,422

[45] Apr. 29, 1980

[54] CLOSURES OF BUNKERS FOR HOLDING REFUSE

[75] Inventor: Eberhard Stodt, Düsseldorf, Fed. Rep. of Germany

[73] Assignee: Lindemann Maschinenfabrik GmbH, Düsseldorf, Fed. Rep. of Germany

[21] Appl. No.: 866,240

[22] Filed: Jan. 3, 1978

[30] Foreign Application Priority Data

Jan. 14, 1977 [DE] Fed. Rep. of Germany ....... 2701336

[51] Int. Cl.[2] .............................................. B65G 67/20

[52] U.S. Cl. .................................... 414/304; 414/414; 414/417; 100/98 R

[58] Field of Search ................ 214/41 A, 41 R, 17 D; 100/98 R; 414/572, 573, 303, 304, 305, 414–417, 373, 389, 400, 340, 344

[56] References Cited

U.S. PATENT DOCUMENTS

| | | | |
|---|---|---|---|
| 3,753,506 | 8/1973 | Palmer et al. | 214/41 A |
| 4,044,905 | 8/1977 | Liberman et al. | 214/41 A |
| 4,102,262 | 7/1978 | Liberman et al. | 100/98 |

*Primary Examiner*—Stephen G. Kunin
*Assistant Examiner*—Edmond G. Rishell, Jr.
*Attorney, Agent, or Firm*—Toren, McGeady and Stanger

[57] ABSTRACT

A refuse bunker of the kind having a horizontal open-topped pressing box disposed beneath a filling hopper and a pressing plunger which is movable longitudinally in the pressing box to feed refuse through an outlet opening of the bunker and, in use, into a container, is provided with a closure which is situated on the outlet side of the outlet opening. The closure includes three passage openings for the passage of refuse from the outlet opening, the passage openings being disposed in two spaced-apart vertical planes. One passage opening, which is in a plane furthest from the outlet opening, is in a stationary member and is aligned with the outlet opening and the other two of the passage openings are vertically movable, are spaced apart one above the other, are of different heights from each other and are situated in a plane between the plane of the stationary opening and the plane of the outlet opening. The two vertically movable passage openings are preferably provided in a slider guided in a frame fixed to a wall of the bunker in which the outlet opening is provided and the frame forms the stationary member. By movement of the slider, either one of the vertically movable openings can be brought into an operative position in between the outlet opening and the stationary passage opening.

7 Claims, 9 Drawing Figures

CLOSURES OF BUNKERS FOR HOLDING REFUSE

BACKGROUND OF THE INVENTION

This invention relates to closures of bunkers for holding refuse and comprises a horizontal, open-topped pressing box disposed beneath a filling hopper and a pressing plunger which is movable longitudinally in the pressing box to feed refuse through an outlet opening of the bunker and, in use, into a container.

Such bunkers are known from German Offenlegungsschrift No. 2,148,333 and are used for transferring refuse brought in by collector vehicles from a limited collection region such as a town, and compacting it into containers, to enable it to be economically transported to dumps or incinerator plants at greater distances away. Economical transportation of the refuse is, however, not merely a matter of the capacity of the containers and vehicles used, but above all also a question of the economics of the transfer technique. One of the requirements to be fulfilled here is that the containers shall be filled as rapidly as possible with the greatest possible quantity of refuse; this last requirement implies, amongst other things, uninterrupted and as far as possible unimpeded operation of the pressing plunger of the bunker which pushes the refuse into the containers.

An uninterrupted operation of the pressing plunger is, however, only possible if sufficient refuse is always available, that is to say if refuse is continuously supplied at a sufficient rate to the filler hopper. This is, however, not the case with the known bunker, so that the very small buffer of refuse above the pressing plunger is already used up before one changeover of the refuse collecting vehicle delivering the refuse has been completed. But even if appropriate measures were taken to provide a sufficient volume of refuse as a buffer above the pressing plunger, difficulties would occur with the known bunker due to refuse jamming in the vicinity of the outlet opening.

The properties of the refuse have a particularly disadvantageous effect when transfer loading is effected by means of known devices. The refuse, which is constituted basically of household rubbish, bulky waste and industrial waste, forms a cohesive, heterogeneous mass as a result of matting and clinging together of certain constituents, such as highly elastic textiles, ladies stockings, pieces of wire, plastics sheets, computer tapes, twigs and branches, and this mass has to be rammed into the container. It frequently occurs that when filling of the container has been completed, because of the impossibility of metering the quantity of refuse in the hopper so that after the last stroke of the plunger the pressing box is empty, a continuous bridge of refuse extends between the container and the bunker, with the result that, when the container is moved away from the bunker, refuse is pulled both out of the container and out of the bunker and is scattered on the ground. This is unpleasant and undesirable from many aspects, since in the first place it is difficult to close a door of the container tightly and securely due to the refuse hanging out therefrom, and secondly the refuse which has fallen out quickly accumulates to such an extent that it constitutes a hazard to the environment and also impedes the container traffic. Finally, it is also difficult to connect an empty container automatically in a sealed manner to the bunker, when refuse is hanging out of the outlet opening.

SUMMARY OF THE INVENTION

The aim of the present invention is to provide a bunker as described above with a closure, which makes it possible to fill the containers with refuse uninterruptedly and as far as possible without the refuse clotting and jamming, a closure being produced both at the container side of the outlet and also at the bunker side of the outlet at the termination of each filling operation, so that in all circumstances the hanging out and/or pulling out of refuse, as the container is moved away from the bunker, is prevented.

To this end, according to this invention, we provide a refuse bunker comprising a horizontal, open-topped pressing box disposed beneath a filling hopper and a pressing plunger which is movable longitudinally in the pressing box to feed refuse through an outlet opening of the bunker and, in use, into a container, wherein the outlet opening is provided with a closure which is situated on the outlet side of the outlet opening and includes three passage openings for the passage of refuse from the outlet opening, the passage openings being disposed in two spaced-apart vertical planes, one passage opening, which is in a plane furthest from the outlet opening, being in a stationary member and being aligned with the outlet openings and the other two of the passage openings being vertically movable, being spaced apart one above the other, being of different heights from each other and being situated in a plane between the plane of the stationary passage opening and the plane of the outlet opening, either one of the two vertically movable passage openings being movable into an operative position between the outlet opening and the stationary passage opening.

With this arrangement it is possible to bring into use passage openings of specific dimensions which are adapted to the particular operation required. In one especially advantageous embodiment, the movable passage openings are provided in a slider which is guided in a frame which is fixed to a wall of the bunker in which the outlet opening is provided and the frame forms the stationary member. Apart from the fact that this provides an extremely simple form of closure which can be adapted to the most varied operating requirements and which is accompanied by a freedom from operating difficulties which is especially desirable in the handling of refuse, a closure constructed in this way can be fitted without costly conversion work to existing bunkers.

It has proved especially effective to provide two passage openings in the closure slider. One of these openings, and preferably the upper opening, is of the same shape and size as the stationary passage opening, and the other vertically movable passage opening is of smaller height than the one of the two movable passage openings and is of the same shape and size as a working face of the plunger.

With this form of construction, wherein one of the movable passage openings has an area larger than that of the working face of the plunger, jamming of bulky objects is very largely avoided, and indeed use is additionally made of the feature of the already described tangling and matting of the refuse, in that when the larger passage opening is in use, more refuse is conveyed into the container during each plunger stroke than is actually situated in front of the working surface of the plunger. Bridges of refuse which may at times form can be avoided or broken down in a manner which will be explained in detail, for which purpose the slider itself can advantageously be fitted with a shearing knife.

Since, as already explained, the two vertically movable passage openings are spaced apart from one another, the part of the slider between the two openings can with advantage be used as a closure region. In this connection, no critical condition exists in regard to the dimensions, but two alternatives are preferred. With a high closure region, which leads to a somewhat longer slider, the vertical distance between the two movable passage openings is equal to the height of the stationary passage opening, whereas in the case of a lower closure region and consequently a shorter slider, the vertical distance between the two movable passage openings is smaller than the height of the stationary passage opening by an amount equal to or less than the height of the working face of the plunger. Whereas the closure slider with the high closure make complete covering of the stationary passage opening possible at every position of the plunger, with the space-saving form of construction with the lower closure region, complete closure of the stationary opening is also possible, but only with the plunger in its advanced position, in which the plunger projects into the movable passage opening which is situated below the closure region. This movable passage opening has a shape and size in which the working face of the plunger fits.

During the filling of a container, the larger, preferably upper, passage opening is in alignment with the stationary passage opening, to which it is preferably equal in size and shape. If, contrary to expectation, accumulation of jamming of refuse occurs during the filling operation in the region of the openings, and this is a possibility which cannot be entirely prevented in the transport of bulky refuse, then this jamming can be overcome in a simple manner by raising and lowering the slider once or twice. The refuse in the region of the outlet opening and the passage openings is then subjected to a tamping and vibrating effect between the openings as they move relatively to each other.

In order to make this technique for dispersing refuse accumulations still more effective, according to a further feature of the invention, a lower edge of the vertical movable passage opening which is of the same shape and size as the stationary passage opening carries a shearing knife which is directed towards the stationary passage opening, and a counter-knife, which co-operates with the shearing knife, is fixed to the upper edge of the stationary passage opening.

With this arrangement an additional cutting effect can be exerted when required, either separately or during the course of the tamping and vibrating movement, by appropriate raising of the closure slider. This renders the closure particularly suitable for wide-ranging use, having regard especially to the need to keep pollution of the environment as low as possible and to make the trans-shipment technique more effective.

At least at the end of a filling operation, one complete stroke of the slider, as a cutting stroke if the above-described shearing knife is fitted, should be carried out to destroy any possible bridge of refuse that may exist, between the bunker and the container. In this way the outlet opening and also the stationary passage opening aligned therewith are covered by means of the closure region which is then situated at the appropriate height. The already mentioned smaller passage opening which is preferably disposed in the lower region of the slider and has a shape and size corresponding to that of the working face of the plunger, enables the refuse situated in the container near to the door opening to be compacted and to be still more effectively prevented from falling out as the container is pulled away from the bunker. This is effected in that through this passage opening, which may be termed an "after-ramming opening," the pressing plunger can move into the container with the passage opening closed by the plunger. Thus the plunger can impart additional firmness to the outermost layer of refuse filled into the container, and at the same time press the door opening of the container clear of refuse. The pressing plunger is then retracted only sufficiently far for its working face to stop in the region of the after-ramming opening of the closure slider, so that no refuse can escape out of the bunker at least until a new container has been connected up to the bunker and the filling operation is continued.

An example of a bunker in accordance with the invention will now be described with reference to the accompanying diagrammatic drawings, in which:

DETAILED DESCRIPTION OF THE INVENTION

Figure 1:
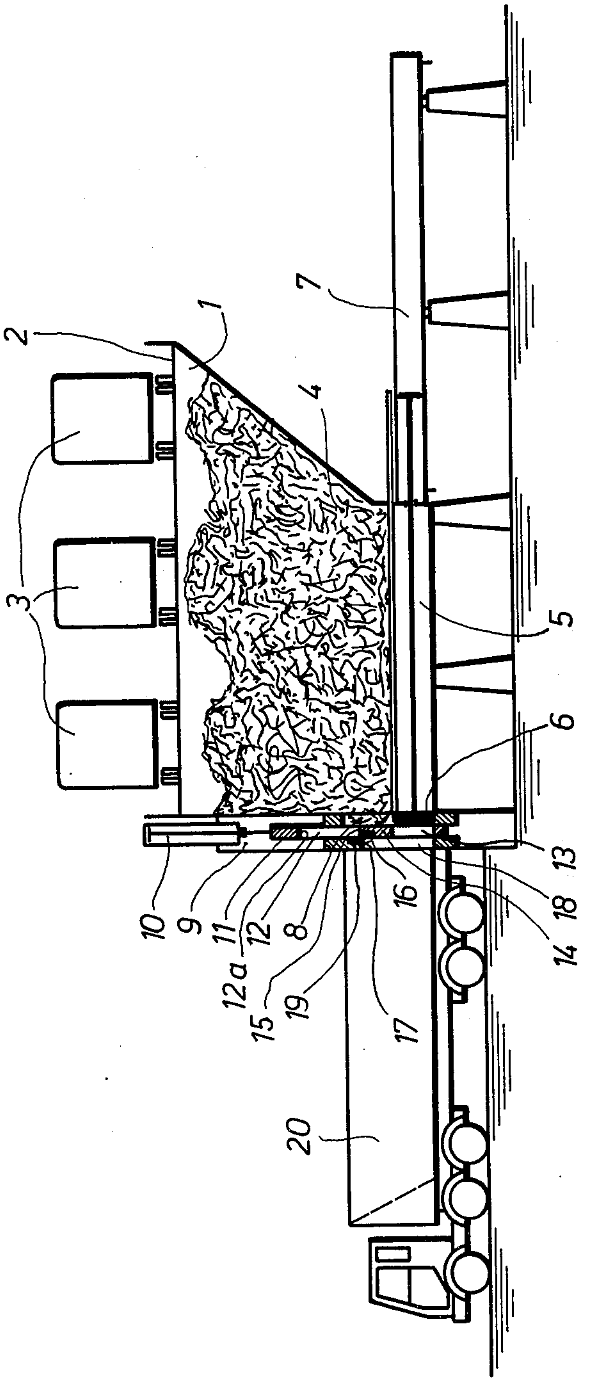
FIG. 1 is a sectional side view of a bunker for filling containers with refuse, the bunker having its closure in a closed position.

The basic construction of a bunker which is equipped with a closure according to this invention, will first be described with reference to FIG. 1. It should be stated that the closure is suitable not only for a station of the type illustrated here, but can be utilized anywhere that a certain buffer of material is present or desired and at the same time a clean closure between the bunker or corresponding intermediate store and the device to be loaded is required.

In the example illustrated, the bunker comprises a filling hopper 1, which is disposed below a platform 2, from which refuse 4 to be trans-shipped is delivered and tipped into the filling hopper 1 for example by means of refuse collector vehicles 3. The bottom of the filling hopper is formed by an open-topped pressing box 5, in which a pressing plunger 6 is longitudinally slidable being actuated by means of a hydraulic cylinder 7. A vertical bunker wall at the left in FIG. 1 is equipped with an outlet opening 8, in front of which there is a frame 9, connected to the wall. A closure slider 11 is guided in the frame 9 and movable upwards and downwards by means of a hydraulic cylinder 10. The slider 11 has an opening 12, which in the example illustrated has the same dimensions as the outlet opening 8. Below the opening 12, a further opening 13 is provided, which is subsequently referred to, for reasons already explained, as the "after-ramming opening" and corresponds in its shape and size to the working face of the pressing plunger 6. The portion of the slider 11 situated between the openings 12 and 13 constitutes the closure region 14 of the slider and it operates as explained later in its different forms.

A shearing knife 16 is fixed to the outwardly directed lower edge 15 of the opening 12, and a counter-knife 19, which co-operates with the knife 16 is provided on the inner, upper edge 17 of a stationary passage opening 18 provided in the frame 9 in a vertical plane situated in front of, that is on the outlet side of, the slider 11 and parallel thereto.

In operation, a container vehicle 20 is connected to the frame 9 in alignment with the stationary passage opening 18, in order to fill this container with refuse.

Figure 2:
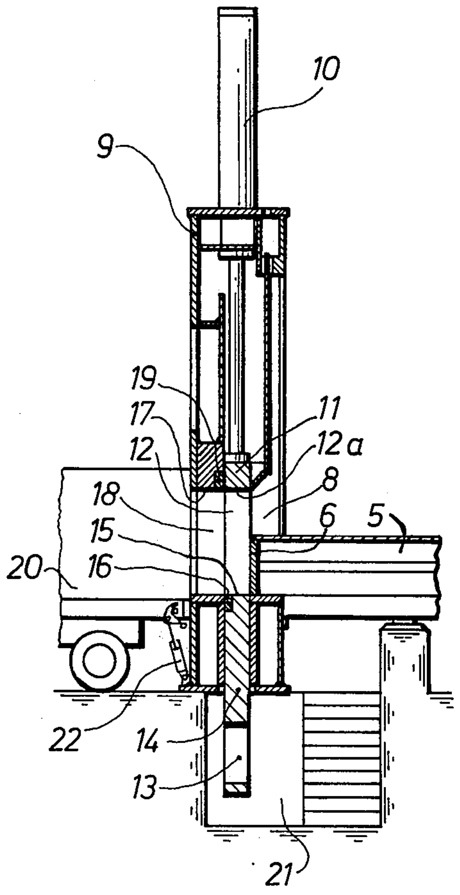
FIG. 2 is a sectional side view of the closure of the bunker to a larger scale, the closure having a slider which is shown in a position for loading a container.
Figure 3:
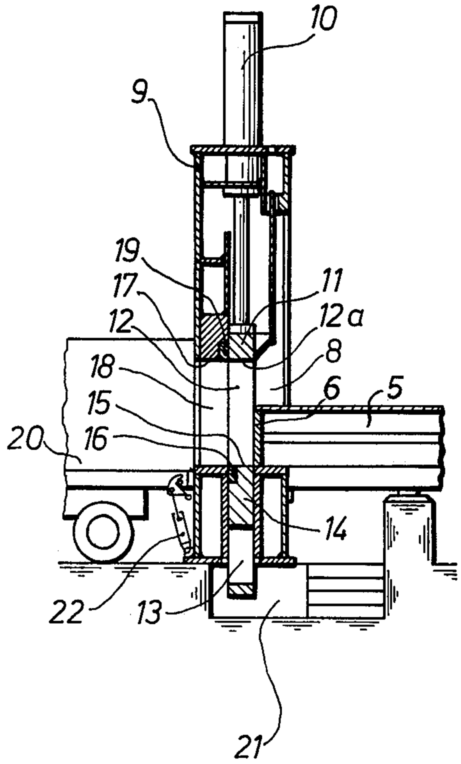
FIG. 3 is a veiw similar to FIG. 2, but showing the closure with a different slider; and, FIGS. 4 to 9 are side views of the bunker shown in FIG. 1 to a smaller scale and showing various operating positions of the slider of the closure.

FIGS. 2 and 3 illustrate two preferred examples of the slider 11. These differ in the dimensions of the closure region, which corresponds in the example shown in FIG. 2 in its dimensions exactly to those of the stationary passage opening 18, so that in the raised position of the slider 11 a tight closure is provided by the closure region 14, independently of the position of the pressing plunger 6. By contrast, the closure region 14, in the example of FIG. 3, is so dimensioned in its height that its height plus the height of the after-ramming opening 13, is equal to the height of the stationary passage opening 18.

Below the frame 9, as can be seen from FIGS. 2 and 3, a maintenance access pit 21 is provided. The container vehicle 20, the rear portion only of which is shown in FIGS. 2 and 3, is connected to the passage opening 18 with its rear face aligned by means of a pawl connection 22 in the position for filling.

The mode of operation of the closure is explained below with reference to the example of the short closure slider illustrated in FIG. 3 and having a closure region 14 of smaller height. The operation is the same in essence also for the longer form of slider shown in FIG. 2 with the higher closure region 14, with the difference that the latter makes possible a tight closure even when the plunger 6 is retracted.

Figure 4:
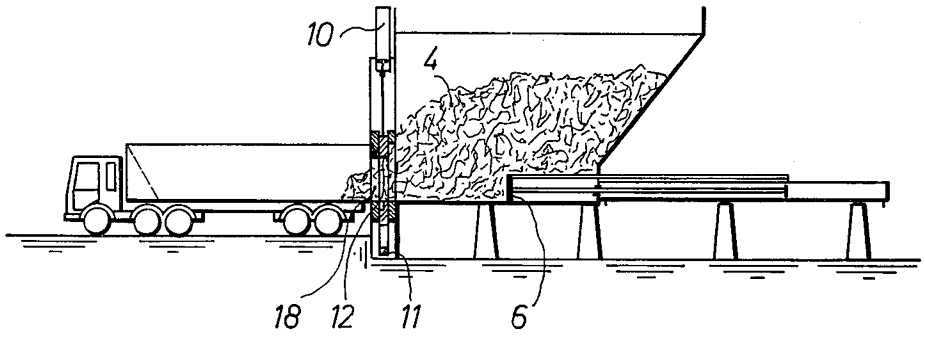

When in the position shown in FIG. 1, the plunger 6 is adjacent the after-ramming opening 13, so that its working face is directly at the closure slider 11. In this operating position, the portion of the outlet opening 8 situated above the pressing plunger and the opening 18 is covered by the closure region 14 of the slider 11. As shown in FIG. 4, the closure slider 11 has been lowered out of the position of FIG. 1 sufficiently far for its upper opening 12 to be in alignment with the opening 18. The pressing plunger 6 has meanwhile executed a return stroke, so that refuse falls into the space of the pressing box exposed in front of the pressing plunger 6.

Figure 5:
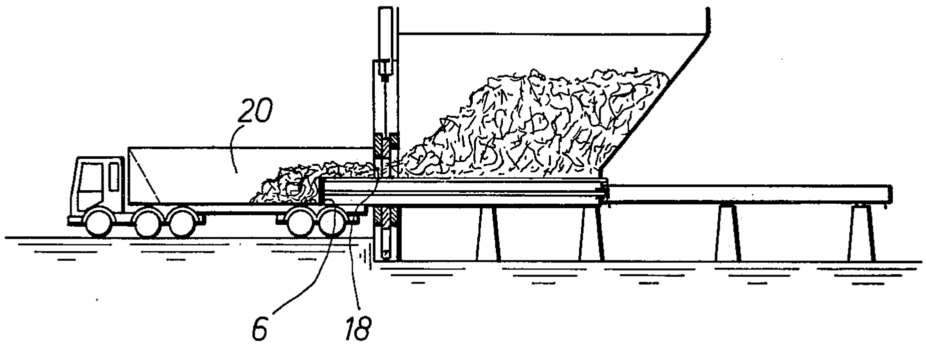

Next, the pressing plunger 6 moves forward as shown in FIG. 5 into its forward limiting position, in which it penetrates into the container 20. In this operation, for reasons already explained, it is not only the refuse situated directly ahead of the pressing plunger that is fed into the container, but as a consequence of the tangling and matting of the pieces of refuse with one another, also a portion of the refuse 4 situated above the pressing plunger in the filling hopper 1 is pushed into the container as shown in FIG. 5. This increased filling effect is attained by the feature that the opening 18, and also the outlet opening 8, are of greater height than the pressing plunger 6. This feature has the additional advantage that jamming of the pressing plunger in the outlet opening 8 and the opening 12 is virtually eliminated due to the clearance in height.

Figure 6:
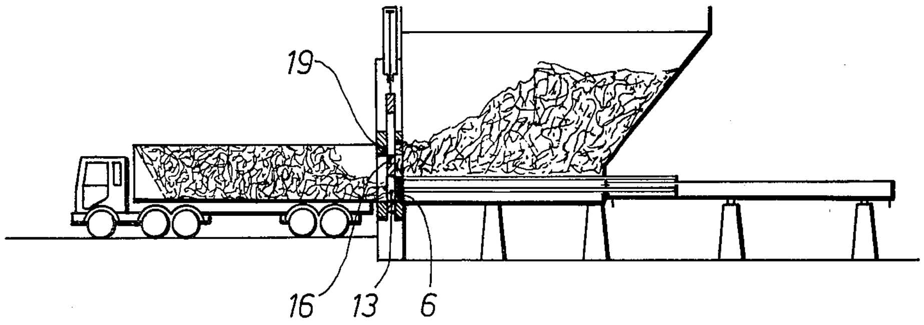
Figure 7:
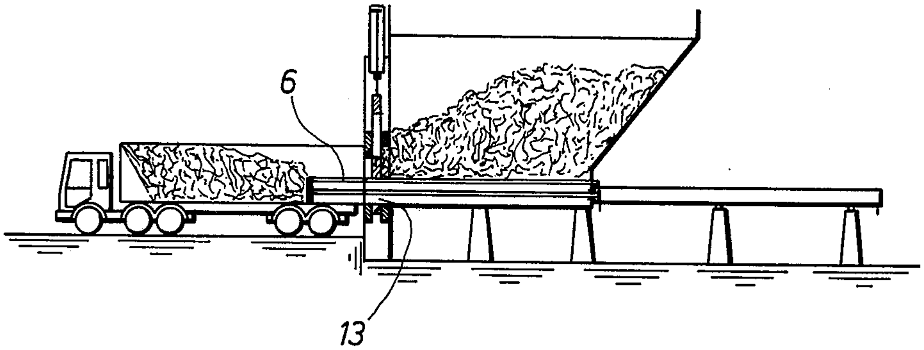

In the position shown in FIG. 6, the desired quantity of refuse has been introduced into the container and the closure slider 11 has been raised sufficiently far, firstly for the shearing knives 16 and 19 to overlap and to have cut through any material bridge which may have formed, and secondly for the after-ramming opening 13 to be in alignment with the pressing plunger 6. Next, as can be seen from FIG. 7, by advancing the pressing plunger 6 through the after-ramming opening 13 and into the container, the pile of refuse formed at the closure is pushed still further into the container and thereby compacted, in order to clear the door opening of the refuse container to enable to door (not shown) to be closed, and also to prevent refuse from falling out of the container as the container moves away from the frame 9 before its door is closed.

Figure 8:
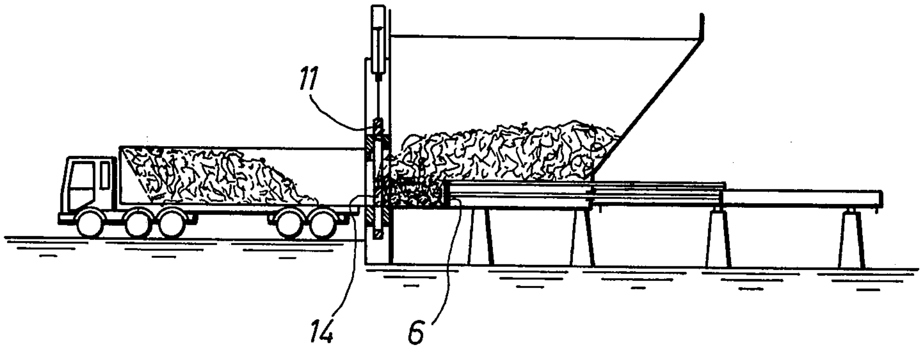
Figure 9:
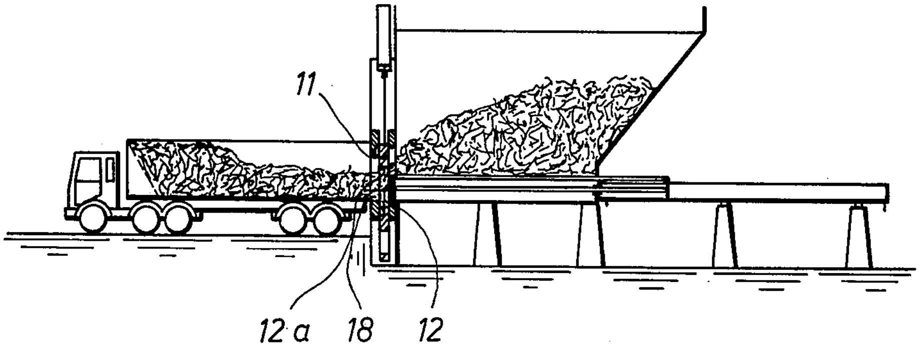

In FIGS. 8 and 9, two possible intermediate positions of the closure slider 11 with a low closure region 14 are illustrated. These positions can be adopted if desired during the above-described sequence of operations. In the position of the slider shown in FIG. 8, the closure region 14 is aligned with the pressing plunger 6, so that it is possible to press and compact large bulky pieces of refuse, such as large boxes, packing cases or the like against the slider, in order as far as possible to eliminate spaces in the container filling and to reach a satisfactory filling density, without excessively loading the relatively thin container walls.

During the filling operation, blockages can occur in the region of the outlet opening 8 and the passage opening 18, due to the jamming of bulky pieces of refuse. In such a situation, the closure slider is lowered, as shown in FIG. 9, sufficiently far for the upper edge 12*a* of the upper opening 12 to act as a rammer to compact and orientate pieces of the refuse situated in this region. A further improvement to this effect is possible by effecting a short-stroke, up and down movement of the slider 11, which causes the refuse alternately to be raised, dropped and thus loosened and then be tamped. Finally, the slider 11 can also be raised sufficiently far for the shearing knives 16, 18 to cut through the material.

I claim:

1. In a refuse bunker of the kind comprising a horizontal pressing box having an open top, a filling hopper positioned above said pressing box and arranged to discharge refuse into said pressing box, a pressing plunger, means movably mounting said pressing plunger for movement longitudinally of said pressing box, said pressing box having an outlet opening at one end thereof and said means movably mounting said plunger arranged to feed refuse from said pressing box through said outlet opening and, in use, into a container, the improvement comprising closure means for said outlet opening located outside of said outlet opening from said pressing box, said closure means including means defining three passage openings for the passage of refuse from said outlet opening, said passage openings being disposed in two spaced-spart vertical planes, said passage defining means including a stationary first member defining one of said passage openings and situated in a plane spaced from said outlet opening, a movable second member defining the other two passage openings and located between said outlet opening and said first member, said passage opening in said stationary member being aligned with said outlet opening, means for vertically moving said second member defining the other two of said three passage openings, said other two passage openings being spaced apart one above the other and being of different heights from each other.

2. A bunker as claimed in claim 1, further comprising a wall of said pressing box forming said means defining said outlet opening, said closure means comprising a frame fixed to said wall, said second member comprises a slider located in said frame, means slidably mounting said slider for upward and downward movement in said frame, and said frame forming said stationary first member.

3. A bunker as claimed in claim 1, further comprising said plunger having a working face thereon, and one of the said other two passage openings is of the same shape and size as said passage opening in said stationary first member and the other of said other two passage openings is of smaller height than said one of said other two passage openings and is of the same shape and size as said working face.

4. A bunker as claimed in claim 1, in which said other two passage openings in said second member are spaced apart from each other by a clear vertical distance equal to the height of said passage opening in said stationary first member.

5. A bunker as claimed in claim 3, in which said other two passage openings are spaced apart from each other by a clear vertical distance which is smaller than the height of said passage opening in said stationary member by an amount not greater than the height of said working face.

6. A bunker as claimed in claim 1, wherein said passage opening in said stationary first member is of the same size and shape as said outlet opening.

7. A bunker as claimed in claim 3, wherein said one of said other two passage openings having a lower edge, a shearing knife fixed along said lower edge, said shearing knife being directed towards said passage opening in said stationary first member, said passage opening in said stationary member having an upper end, and a counter-knife fixed to said stationary member along said upper edge, said counter-knife being adapted to cooperate with said shearing knife.

* * * * *